US012023597B1

(12) United States Patent
Harris et al.

(10) Patent No.: US 12,023,597 B1
(45) Date of Patent: Jul. 2, 2024

(54) SYSTEM AND METHOD FOR MIXING PRIZES IN PRIZE CAPTURE AND DISPENSING DEVICES

(71) Applicant: Aries Technology LLC, Las Vegas, NV (US)

(72) Inventors: Ronnie W. Harris, Las Vegas, NV (US); Ronald Wayne Wallace, Las Vegas, NV (US)

(73) Assignee: Aries Technology, LLC, Las Vegas, NV (US)

( * ) Notice: Subject to any disclaimer, the term of this patent is extended or adjusted under 35 U.S.C. 154(b) by 160 days.

(21) Appl. No.: 17/481,135

(22) Filed: Sep. 21, 2021

(51) Int. Cl.
*A63F 9/30* (2006.01)
*G07F 17/32* (2006.01)

(52) U.S. Cl.
CPC ............ *A63F 9/30* (2013.01); *G07F 17/3297* (2013.01)

(58) Field of Classification Search
CPC .......... A63B 9/32; A63B 9/30; G07F 17/3297
See application file for complete search history.

(56) References Cited

U.S. PATENT DOCUMENTS 1,882,563 A * 10/1932 Bartlett .................. G07F 17/32 221/24
5,415,417 A * 5/1995 Reis, Jr. .................. G07F 17/32 273/447
5,855,374 A 1/1999 Shoemaker, Jr.
6,152,447 A 11/2000 Stanley
6,588,760 B2 7/2003 Carter, Jr. et al.
6,598,881 B1 7/2003 Shoemaker, Jr.
6,899,337 B2 5/2005 Fisher et al.
8,070,167 B1 * 12/2011 Shoemaker, Jr. ......... A63F 9/30 273/447
8,079,596 B1 * 12/2011 Shoemaker, Jr. ... G07F 17/3297 273/447
10,109,159 B1 * 10/2018 Shoemaker, Jr. ..... A63F 9/0079
2003/0090065 A1 * 5/2003 Carter, Jr. ................. A63F 9/30 273/447
2009/0191931 A1 7/2009 Peck
2012/0190417 A1 * 7/2012 Balaban .................... A63F 9/24 463/9
2012/0267850 A1 * 10/2012 Lim .................... G07F 17/3216 273/126 A
2013/0231166 A1 * 9/2013 Riggles ............... G07F 17/3297 273/447
2018/0137718 A1 * 5/2018 Smart ................ G07F 17/3253
(Continued)

FOREIGN PATENT DOCUMENTS

BE 1026440 A1 * 1/2020
CN 111696276 A * 9/2020

*Primary Examiner* — Raleigh W Chiu
(74) *Attorney, Agent, or Firm* — WEIDE & MILLER, LTD.

(57) ABSTRACT

A prize mixer is provided for a prize capture and dispensing device. The prize mixer is configured to change the location and/or orientation of prizes within a prize area of the device, preferably by contacting one or more of the prizes. The prize mixer may be located at or near a bottom of the prize area and be configured to move relative to the prizes, such as in a linear or rotating motion. The prize mixer may comprise a plurality of rotatable arms which define ramped surfaces, the arms rotated by a drive shaft. The prize mixer may be activated automatically or by a player of the device, such as for payment, as a bonus, or upon a triggering event.

20 Claims, 5 Drawing Sheets

(56) References Cited

U.S. PATENT DOCUMENTS

| | | | | |
|---|---|---|---|---|
| 2019/0213825 | A1* | 7/2019 | Shoemaker, Jr. | G07F 11/165 |
| 2021/0056809 | A1* | 2/2021 | Harris | G07F 17/3239 |
| 2022/0088472 | A1* | 3/2022 | Tsai | A63F 9/30 |

* cited by examiner

SYSTEM AND METHOD FOR MIXING PRIZES IN PRIZE CAPTURE AND DISPENSING DEVICES

FIELD OF THE INVENTION

The present invention relates to a system and method for mixing prizes in prize capture and dispensing devices.

BACKGROUND OF THE INVENTION

Prize capture and dispensing devices are known and may comprise an amusement device where a user or player attempts to capture or retrieve a prize from a prize area, and where a captured prize may be dispensed or awarded to the player. Such devices include devices known as “claw” machines where a player uses a claw to try and capture a prize, or a “crane” machine where a player uses a crane to try and capture a prize. Of course, the device might include other mechanisms by which the user or player attempts to capture or retrieve a prize.

Prize capture and dispensing devices are presented in a variety of public locations for entertainment, including arcades, restaurants, casinos, etc., and typically require the player to pay for one or more of such attempts, thereby generating profit. Thus, the greater number of players that a prize capture and dispensing device can attract, the more profitable the machine will be.

An attraction of these types of devices is a prize area that contains a large number of prizes. The large number of prizes allows the presentation of a number of different prizes for capture, and also entices the player into believing that a significant opportunity exists to capture a prize, given that they simply need to capture one of many prizes. As a result, the prize areas of these devices are typically filled with a large number of prizes, where the prizes are stacked on top of each other.

A problem with this configuration is that prizes at the bottom of the prize area are essentially buried and may not be captured by any player until the prizes on top are all dispensed. However, if a player is not interested in the prizes on top or can’t retrieve prizes that they are more interested in or are more valuable and are located at the bottom of the prize area, then the player may not feel any desire to play the prize capture and dispensing device.

Further, these prize capture and dispensing devices often utilize flashing lights, sounds or the like to capture the attention of potential players. These methods of attracting players, however, are often not effective, particularly in areas with other games that have flashing lights or make sounds.

A prize capture and dispensing device which addresses these and other problems is desired.

SUMMARY OF THE INVENTION

Aspects of the invention include a prize mixer and a prize capture and dispensing device including a prize mixer. The prize mixer is configured to change the location and/or orientation of prizes within a prize area, preferably by contacting one or more of the prizes. In one embodiment, the prize mixer is located at or near a bottom of the prize area and is configured to move relative to the prizes, such as in a linear or rotating motion.

One embodiment of a prize mixer for a prize capture and dispensing device having a prize area containing prizes comprises a rotatable shaft; one or more radially extending members connected to the rotating shaft and at least partially located in the prize area, said one or more radially extending members having one or more contacting surfaces configured to contact one or more prizes in the prize area when rotated by the rotatable shaft; and a drive mechanism coupled to the rotatable shaft to effect rotation of the rotatable shaft.

One embodiment of a method of mixing prizes in a prize area of a prize capture and dispensing device comprises the steps of activating a drive mechanism of a prize mixer and causing, as a result of the activation of the drive mechanism, one or more prize mixing elements located in the prize area to move one or more of the prizes by contacting the prizes to effectuate a mixing of the prizes.

The prize mixer may be actuated by hand, or by a motor, such as under the control of a controller. The prize mixer may be actuated automatically at one or more times, or might be activated by a player of the device, such as for payment, upon a triggering event, or as a bonus.

Further objects, features, and advantages of the present invention over the prior art will become apparent from the detailed description of the drawings which follows, when considered with the attached figures.

DETAILED DESCRIPTION OF THE INVENTION

Figure 1A:
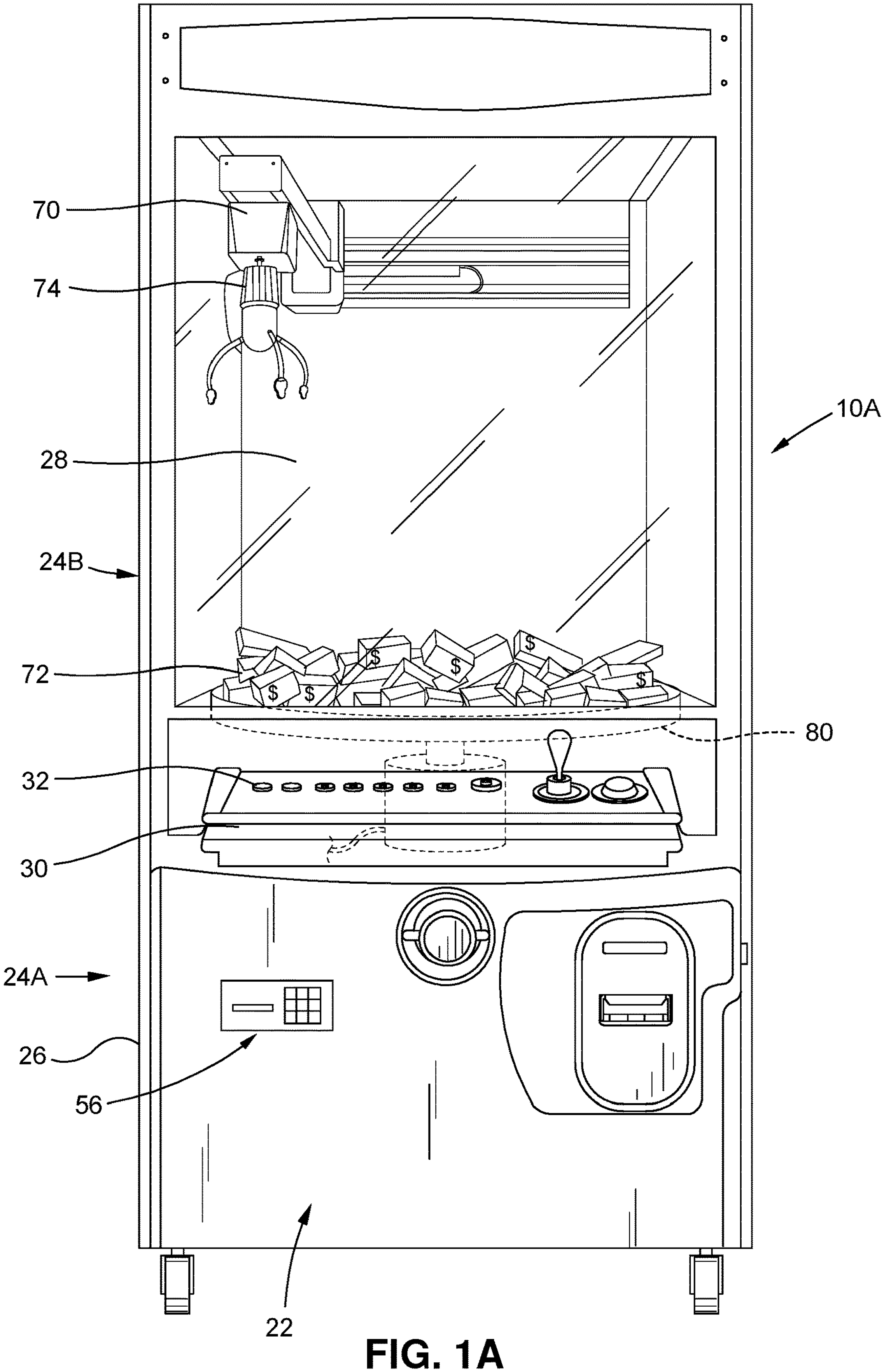
FIG. 1A illustrates a prize capture and dispensing device in accordance with a first embodiment of the invention.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a prize mixer and a prize capture and dispensing device including a prize mixer. The prize mixer is configured to change the location and/or orientation of prizes within a prize area of the device, preferably by contacting one or more of the prizes. In one embodiment, the prize mixer is located at or near a bottom of the prize area and is configured to move relative to the prizes, such as in a linear or rotating motion.

As disclosed, the prize capture and dispensing device may comprise an amusement-type device or machine (such as where the device can be played for free, including as a reward or bonus, or for payment of a play fee) or may comprise a wagering-type device, such as where the player is required to play the game upon payment of a wager (such as a monetary value wager). The prize capture and dispensing device may include a prize area or prize storage area, such as from which the player attempts to retrieve or capture a prize.

Prize Capture and Dispensing Device

FIG. 1 illustrates an exemplary amusement-type prize capture and dispensing device 10, which may be located at an arcade or other location.

As illustrated, the prize capture and dispensing device 10 generally comprises a housing or cabinet 26 for supporting and/or enclosing various components required for operation of the prize capture and dispensing device 10. In the embodiment illustrated, the housing 26 is generally "box" shaped, having a front (which the player faces) and an opposing back, a right side and a left side (when facing the front), and a top and a bottom. However, the housing 26 could have other configurations, as noted below.

The housing 26 may have one or more enclosed or generally secure areas. For example, the housing 26 may include a first lower secure area 24A for housing one or more first components of the prize capture and dispensing device 10, such as a processor, bill validator (and associated ticket or cash box), and other features. The housing may also include a second upper secure area 24B, such as for housing portions of an amusement game unit, as described in more detail below (which may thus be referred to as the "amusement game area").

The prize capture and dispensing device 10 may include one or more features for accepting monies or monetary value or otherwise allowing a user to pay monies or monetary value for play on the prize capture and dispensing device 10.

The prize capture and dispensing device 10 preferably includes one or more player input devices 32 to enable a player to play of the device (such as input buttons, plunger mechanisms, a touch-screen display, joystick, touch-pad or the like). These one or more input devices 32 may be utilized by the player to facilitate amusement-type game play, such as by providing input or instruction to the prize capture and dispensing device 10 regarding movement of a prize capture element of the device 10.

In the exemplary embodiment in FIG. 1A, the prize capture and dispensing device 10A may comprise a crane or claw machine, where a player attempts to guide a crane or claw to a position and then use the crane or claw to grab an object, such as a prize. In the case of the crane/claw machine, the one or more player input devices 32 may thus comprise a crane control such as a joystick and claw drop button which communicate player inputs thereto to a processor, which then generates corresponding control instructions for output to a crane controller (which may control one or more motors or the like for changing the location of the crane, dropping a claw of the crane, closing a bucket or claw of the crane, etc.). Of course, the device 10A might have other configurations, such as comprising a crane device involving movement of a crane or scoop type device for attempting to capture a prize.

In this configuration, one or more prize capture device or elements are preferably located in the second or upper area 24B of the prize capture and dispensing device 10A. As illustrated, the second area 24B is preferably generally enclosed to define an interior area. Moreover, the second or upper area 24B may be at least partially enclosed by one or more transparent panels so that the interior of the area is visible to the player. Inside of the second area 24B may be located a crane or claw 70 and one or more prizes 72. The crane or claw 70 may be located above the prizes 72, which may be located at a bottom of the second area 24B (wherein the area in which the prizes are located may be referred to as a "prize area"). Prizes might be located in the prize area in various ways, including by being piled or stacked on the bottom or base of the second area 24B, or by being located on a stand or rotating platform in the second area 24B.

In general, play or operation of the device comprises movement of the prize capture device to attempt to capture a prize. The movement of the prize capture device might be automatic (such as automatically initiated or initiated upon input of the player, where movement of the prize capture device is not controlled by the player) or based at least partially on one or more inputs by the player, such as inputs to a joystick or other controller that control the movement (location/direction) of the prize capture device. In a configuration where the prize capture device is a claw, the claw may lower or drop downwardly to the prizes (automatically, after a certain period or time, or upon input from the player). The claw may then close and potentially grab or grasp one of the prizes. The claw may then retract or raise and move to a designated position, such as a home or dispensing position. If the claw successfully retains a prize, the prize may then be awarded to the player. In one embodiment, once at the dispensing position, the claw may open and the prize may drop into a dispensing area where it may be retrieved by the player. In other embodiments, the prize might be scanned or read and an award might be provided to the player, such as in electronic form, in the form of a receipt, etc. (where by the captured prize may not necessarily be physically dispensed and might be returned to the prize area). For example, upon successfully capturing a prize, the device 10A might award a prize ticket for that prize which the player can redeem at another location (prize booth, a prize dispenser or the like) for the prize.

Most importantly, and as described in more detail below, a prize mixer 80 may be located inside the prize capture and dispensing device 10B, and preferably in the prize area 24B. In a preferred embodiment, the prize mixer 80 may be located at the bottom of the prize area 24B or at least below the top of prizes in that area. The prize mixer 80 is configured to contact one or more prizes located in the prize area.

The prize capture and dispensing device 10A may comprise software for use in implementing the operation of the device (via execution of the software via a controller or processor of the device 10A). For example, the prize capture and dispensing device 10 may include a set of game software, which may be stored in the one or more memory devices and be executed by the processor, such as within the operating environment. The processor may execute the game software for use in controlling aspects of the amusement portions of the prize capture and dispensing device 10, such as a crane or claw control, a prize award mechanism or the like. In one embodiment, the player input devices, such as the crane or claw joystick and a drop button, may be controlled by or linked to a controller/processor running the game software.

In one embodiment, the prize capture and dispensing device 10A has a front and one or more of the player input devices 32 are located at the front, such as at a console or deck 30. As indicated, the second area 24B is preferably wholly or partially enclosed by one or more substantially transparent panels. This allows players and third parties to see into the prize area 24B, such as from the front and/or one or both sides—whereby the player can see one or more of the prizes in the prize area.

Figure 1B:
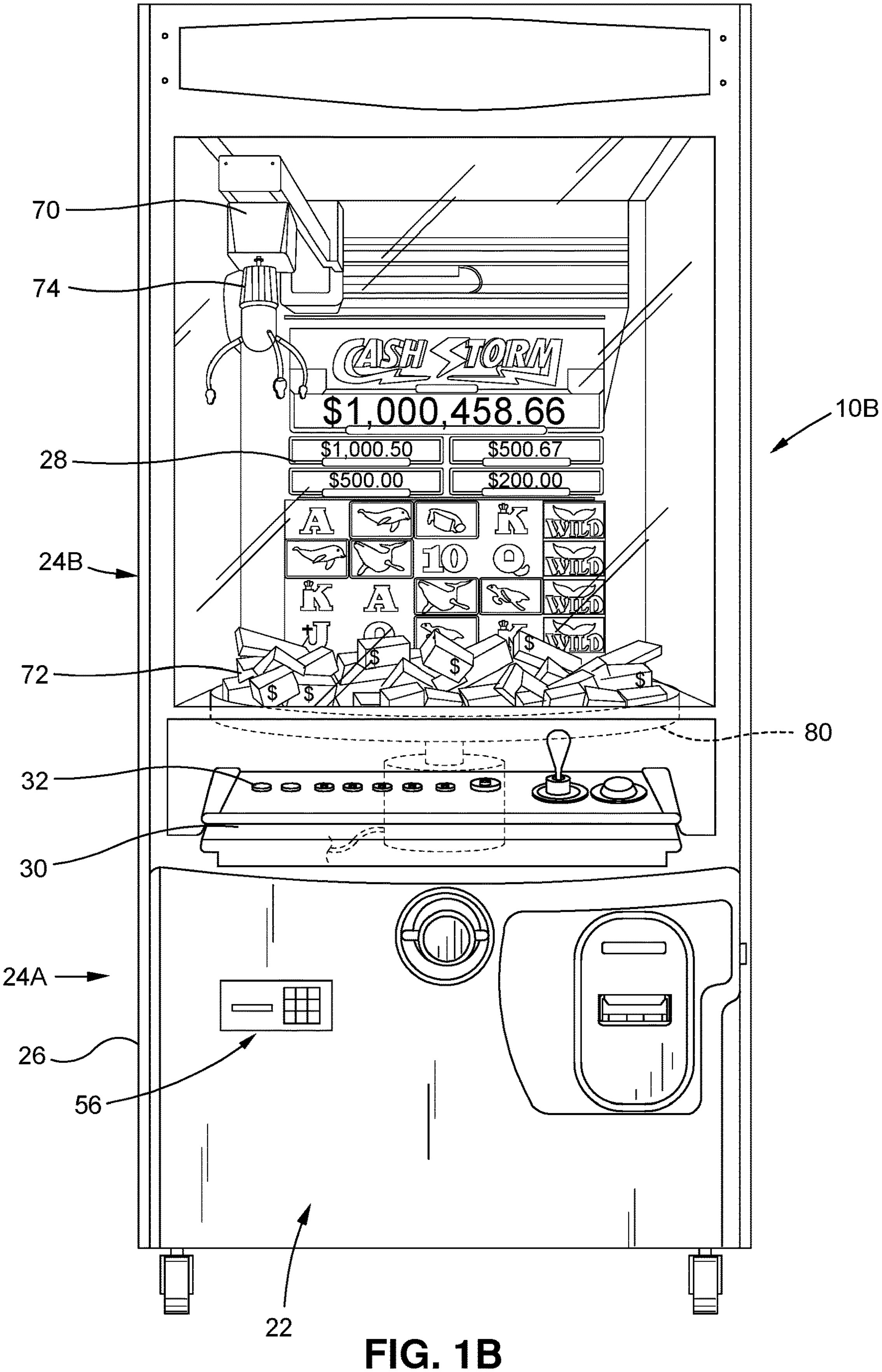
FIG. 1B illustrates a prize capture and dispensing device in accordance with a second embodiment of the invention.

The prize capture and dispensing device 10A may have other configurations and features, such as including one or more displays for displaying information, lights, speakers, coin acceptors and/or other features, such as further described relative to FIG. 1B.

The prize capture and dispensing device 10 of the invention may have a variety of other configurations or features. For example, FIG. 1B illustrates an exemplary prize capture and dispensing device 10B which may include additional elements, such as one or more casino-style wagering games. In such a configuration, the prize capture and dispensing device 10B may be configured to present one or more wagering games and further include the operation of the prize capture and dispensing device—such as where the player is permitted to operate the prize capture and dispensing portion of the device 10B in the event the player receives a particular outcome of the wagering game or the like. Additional features of such a variation of the device are described in U.S. application Ser. No. 15/929,889, filed May 28, 2020, entitled "Dual Wagering Game and Amusement-Style Gaming Unit", which application is incorporated in its entirety by reference herein.

Such a prize capture and dispensing device 10B having a wagering game feature may be located at a casino or other location. As described below, the prize capture and dispensing device 10B may be part of a gaming system, such as a casino gaming system which links two or more of prize capture and dispensing devices 10B or one or more prize capture and dispensing device 10B with other devices, such as one or more table games, kiosks, accounting systems or servers, progressive systems or servers, player tracking systems or servers, game servers, reward or promotional servers or the like.

In addition to the elements discussed in FIG. 1A, the embodiment of the prize capture and dispensing device 10B illustrated in FIG. 1B may additionally comprises one or more features for presenting the one or more wagering games. Suh features may comprise one or more elements for accepting monies or monetary value or otherwise allowing a user to wager monies or monetary value, and features which cause the prize capture and dispensing device 10B to present a wagering game to a player, such as by displaying wagering game information. Certain wagering game outcomes (but preferably not all game outcomes) may be designated as winning outcomes (the non-winning outcomes may be referred to as losing outcomes), wherein prizes or awards may be provided for winning outcomes, such as monetary payments (or representations thereof, such as prize of credits). As such, the prize capture and dispensing device 10 preferably includes a mechanism or means for returning unused monetary funds and/or dispensing winnings to a player, as described in more detail below.

In order to present or display wagering game information to a player, the prize capture and dispensing device 10B may include one or more display devices 28. The display device 28 may comprise an electronic video display such as a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED) or other suitable displays now known or later developed, in a variety of resolutions, sizes and formats (e.g. 4:3, widescreen or the like). The display device 28 may be capable of projecting or displaying a wide variety of information, including images, symbols and other indicia or information associated with game play, game promotion or other events. As illustrated in FIG. 1B, the display device 28 might comprise a single flat panel display. However, the display device 28 might have other configurations (being curved, comprising multiple displays, etc.). Further, while the display device may comprise one or more video displays, in another embodiment, the prize capture and dispensing device 10 may include one or more physical reels capable of displaying game information, such as slot symbols. In such a configuration, means are provided for rotating the physical reels. In one or more embodiments, the means may comprise a mechanical linkage associated with a spin arm, with movement of the spin arm (a "pull") by a user causing the reels to spin. In such an arrangement, the reels are generally allowed to free-wheel and then stop. In another embodiment, electronically controlled mechanisms are arranged to rotate and stop each reel. Such mechanisms are well known to those of skill in the art. In this arrangement, actuation of the spin arm or depressing a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. The principal of such an arrangement is described in U.S. Pat. No. 4,448,419 to Telnaes, which is incorporated herein by reference.

Once again, the wagering-type prize capture and dispensing device 10B preferably includes one or more player input devices 32 to enable a player to play a wagering game (such as input buttons, plunger mechanisms, a touch-screen display, joystick, touch-pad or the like). These one or more input devices 32 may be utilized by the player to facilitate wagering game play, such as by providing input or instruction to the prize capture and dispensing device 10B. For example, such input devices 32 may be utilized by a player to place a wager, cause the prize capture and dispensing device 10B to initiate a game, to initiate a reel spin, to "cash out" of the gaming machine, or to provide various other inputs, such as to buy a game card, and/or daub a card and claim winnings, such as in a game of bingo. In one embodiment, a touch-screen may be associated with the second area 24B of the prize capture and dispensing device 10B. For example, a touch-screen might be associated with a front glass or other transparent panel or display of the second or upper area 24B, whereby the player could provide input by touching the enclosure of the second area 24B in front of them. Of course, in other embodiments, the deck 30 might incorporate one or more displays having a touch screen or otherwise include a touch screen.

In one preferred embodiment, the prize capture and dispensing device 10B includes at least one microprocessor or controller for controlling the gaming machine, including receiving player input and sending output signals for controlling the various components of the prize capture and dispensing device 10B, such as peripheral devices of the machine (such as generating game information for display by the display device 28). The controller may be arranged to receive information regarding funds provided by a player to the prize capture and dispensing device 10 and to thus create or increase a credit balance, receive input such as a purchase/bet signal when a purchase/bet button is depressed (and correspondingly reduce the credit balance), and receive other inputs from a player. The controller may be arranged to generate information regarding a game, such as generating game information for display by at least one display device 28 (such as information comprising game information such as slot symbols, playing cards, bingo cards, bingo balls, etc., depending upon the game being presented), for determining winning or losing game outcomes and for displaying information regarding awards for winning game outcomes, among other things.

The controller may be configured to execute machine readable code or "software" or otherwise process information, such as obtained from a remote server. A first set of game software or other instructions may be stored in memory (such as a data storage device, not shown), e.g. in a fixed or non-transitory configuration, such as for use in implementing the wagering/casino-style game. The memory may also store other information or data, such as data stored in table or other forms (including, but not limited to look-up tables, pay tables and other information including tracked game play information). The prize capture and dispensing device 10B may also include one or more random number generators for generating random numbers (such as implemented by a random number generator software module stored in the memory and executable by the processor 34), such as for use in presenting the game in a random fashion (e.g. whereby the game is presented in a manner in which the player cannot control the outcome) or pseudo-random fashion (e.g. such as where the game includes a skill component which can affect the outcome of the game). As indicated above, the machine readable code may be configured in various manners, such as by having various "modules" of software which are designed to implement specific features of the game play or game presentation. In one embodiment, as illustrated, the processor may execute software that implements an operating system, such as Microsoft® Windows®, Linux, etc. The first set of game software may then be executed relative to that operating environment.

The prize capture and dispensing device 10B may be configured to generate and present games in a stand-alone manner or it may be in communication with one or more external devices or systems at one or more times. The prize capture and dispensing device 10B might communicate with one or more of such external devices or systems via one or more communication ports or other interface devices. These ports or interface devices may be configured to implement various communication protocols (including proprietary protocols) and communicate via wireless, wired or other communication link. For example, the prize capture and dispensing device 10B may be configured as a server based device and obtain game code or game outcome information from a remote game server (in which event the gaming machine controller may receive game information from the server, such as game outcome information, and use that server-generated information to present the game at the gaming machine). As one example, when the prize capture and dispensing device 10B is configured to present a multi-player bingo game, the prize capture and dispensing device 10B may communicate with one or more game servers to obtain information regarding a purchased bingo card, selected or drawn bingo balls, and to confirm game outcomes, such as interim pattern matches or game-ending pattern matches of the drawn bingo balls to the game indicia associated with a bingo card assigned to the player.

Relative to both the variations in FIGS. 1A and 1B, the prize capture and dispensing device 10 may be configured to present one or more games or permit play in exchange for monetary value (in some embodiments, the device 10 might be configured to be played or used as a promotional device, a prize dispensing device, a bonus device or the like, where a player might not be required to provide direct monetary value payment). As indicated, the prize capture and dispensing device 10 is preferably configured to accept value, such as in the form of coins, tokens, paper currency or other elements or devices representing value such as monetary funds. Thus, as indicated above, the prize capture and dispensing device 10 preferably includes a mechanism or means for accepting monetary value. For example, the prize capture and dispensing device 10 might include a coin acceptor for accepting coins. Of course, associated coin reading/verifying devices and coin storage devices may be associated with the prize capture and dispensing device 10 if it is configured to accept coins. Likewise, the prize capture and dispensing device 10 might include a media reader. Such a reader may be configured to accept and read/verify paper currency and/or other media such as tickets. Of course, in such event the prize capture and dispensing device 10 may further be configured with one or more paper currency or ticket storage devices, such as cash boxes, and other paper currency or media handling devices (including transport devices).

The prize capture and dispensing device 10 might also be configured to read FOB s, magnetic stripe cards or other media having data associated therewith and via which value or funds may be associated with the prize capture and dispensing device 10. The mechanism for accepting monetary value might also comprise hardware and/or software which allows a player to transfer (such as electronically) funds from an account, such as a casino wagering account, or a bank or other financial institution account. Such a mechanism might include a communication interface which permits the gaming machine to communicate with a mobile phone, PDA, tablet or other electronic device of the player (such as via a physical interface or wired or wireless communications), such as to enable the transfer of funds from the player to the gaming machine or system.

When the player associates funds with the prize capture and dispensing device 10 or an associated system, a credit balance may be generated. The credit balance may comprise a plurality of monetary value credits. The player may wager some or all of the associated monetary value, such as by wagering one or more of the credits associated with the credit balance. For example, the player might provide input to a play or wager button or touch screen interface to pay to play or place wager a certain number of credits, such as to purchase one or more games or game cards (such as "Bet 1 Credit", "Bet 5 Credits", "Bet Maximum Credits" or other options). In one embodiment, when the player's wager is received, the player's credit balance is reduced by the number of wagered credits. The player might then provide a separate input to begin the game. In other embodiments, the player might select a "play game" input, such as by pressing a "spin" button, which input is taken to comprise both an instruction to place a wager (such as of a pre-set or pre-selected number of credits) and to start the game. Of course, other configurations may be implemented for accepting monetary value from the player and for allowing the player to place a wager from the associated monetary value.

In one embodiment, the player may provide an input to the prize capture and dispensing device 10 to indicate their desire to cash out, such as by selecting a "cash out" button or touch screen feature or providing other input. In response, a monetary value represented by the player's credit balance or the like is preferably paid, transferred or otherwise provided to the player. For example, upon an award or at cash-out, associated funds may be paid to the player by the prize capture and dispensing device 10 dispensing coins to a coin tray. In another embodiment, funds may be issued by dispensing paper currency or other media. In yet another embodiment, a player may be issued a media, such as a printed ticket, which ticket represents the value which was paid or cashed out of the machine. The aspects of gaming machine "ticketing" systems are well known. One such system is described in U.S. Pat. No. 6,048,269 to Burns, which is incorporated herein in its entirety by reference. In yet another embodiment, the cash-out might result in the dispensing of a card or other media which stores or represents the cashed-out funds, such as by writing funds information to a magnetic stripe of a card which is inserted into a media writer of the gaming machine or dispensed from the machine. In this regard, the prize capture and dispensing device 10 may include one or more media printers or writers 48. In other embodiments, the cash-out mechanism may result in the funds value being transferred to an external device or account, such as a player's casino account (such as associated with a casino server), a remote bank or other financial account, or an electronic device such as a player's phone, PDA or tablet.

The prize capture and dispensing device 10 may also include a player tracking device, such as a card reader and/or an associated keypad or other input device (such as a touch screen display) 56. Such player tracking devices are well known and may permit the game operator to track play of players of the device 10. The tracked play may be utilized to offer player bonuses or awards.

The primary controller or processor of the device 10 may communicate with several of the peripheral devices via one or more intermediary controllers. For example, the processor might communicate with one or more audio generating devices or speakers, either directly or through an audio card, to cause the one or more speakers to generate sound. Likewise, the processor might communicate with one or more light generating devices, such as LEDs, to cause them to generate lighting or lighting effects at the prize capture and dispensing device 10, such as via an LED controller. The processor might communicate with other devices of the prize capture and dispensing device 10, such as the player input devices 32, intrusion detection devices (not shown), switches or other elements of the machine, via a peripheral controller.

Prize Mixer

As indicated above, the prize capture and dispensing device 10 preferably includes a prize mixer 80. Additional aspects of the prize mixer 80 will be described with reference to FIGS. 2 to 6.

Figure 2:
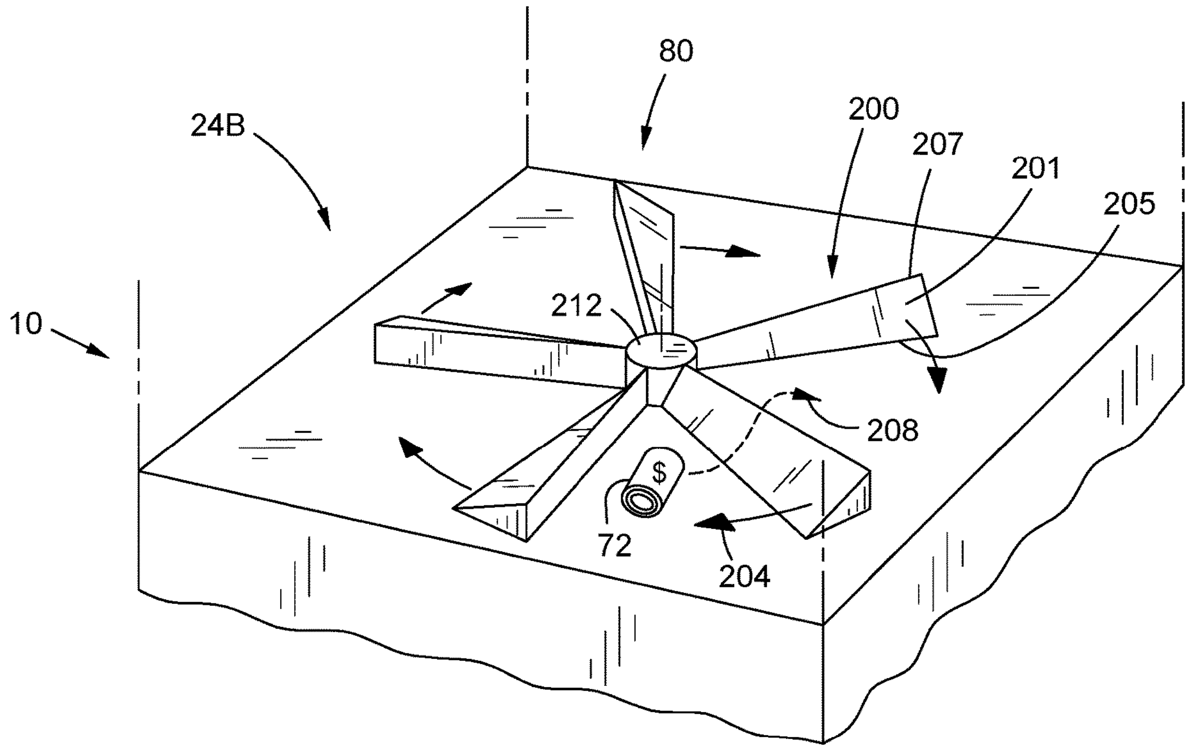
FIG. 2 illustrates one embodiment of a prize mixing device.

FIG. 2 illustrates one embodiment, where the prize mixer 80 is a rotary mixer. In FIG. 2, one or more arms 200 are preferably configured for rotational movement, such as by connection to a rotating drive shaft 212 (or associated element, such as a hub mounted on such a shaft). The one or more arms 200 are preferably located at or near the bottom of the prize area 24B and in contact with the one or more prizes 72 in the prize area 24B. The number of arms 200 might vary, being as few as one, but preferably comprising 2-4 or more.

The arms 200 may be of various type or shapes. In a preferred embodiment, the arm 200 defines a sloping surface or ramp 201 having a lower edge 205 and an upper edge 207, wherein the arm 200 may face or rotate in a direction 204 which causes the prizes 72 to contact the ramp 201 and be moved upwardly along and over the top of the arm at the upper edge 207, as indicated by 208 (this movement effectively "churns" the prizes, not merely by moving in a rotary fashion, but by introducing vertical mixing).

In one embodiment, the arms 200 may be partially and/or entirely retractable towards and away from the rotating shaft 212. Depending on the speed of rotation of the arm(s) 200, the height and/or angle of the ramp 201, the degree of retraction of the arm(s) 200, and/or the duration of mixing (described in more detail below), the degree of mixing may be varied.

Figure 3:
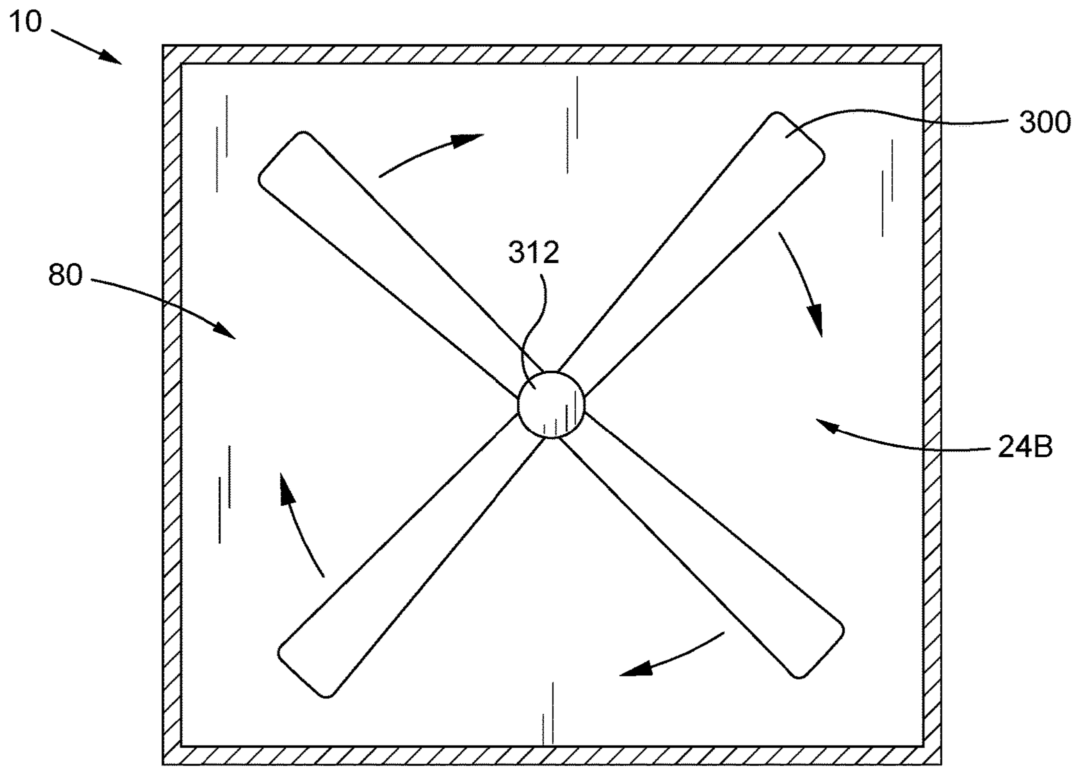
FIG. 3 illustrates another embodiment of a prize mixing device.

FIG. 3 illustrates another embodiment of a rotary prize mixer 80 which also comprises one or more arms or blades 300. Once again, the one or more arms or blades 300 may extend outwardly from a central rotary drive shaft 312 or otherwise be driven in a rotary fashion.

The arms or blades 300 may again be located near the bottom of the prize area 24B, or at least under a top level of prizes in the prize area 24B. In one embodiment, the arms or blades 300 may be tilted or twisted, such as to have a dihedral angle which again causes prizes that impact the arm to be drive upwardly (or downwardly, in the case of a negative dihedral angle). Further, depending upon the speed of rotation of the arm(s) 300, the orientation and/or length of the arm 300 (which might be varied), and/or the duration of mixing, the degree of mixing may be varied.

In some examples, the angle or orientation of the arms 200,300 (such as the angle of the ramps 201) may be varied. For example, in the embodiment illustrated in FIG. 3, the arms 300 might be mounted to the drive shaft 312 in a manner which allows them to be twisted or rotated to change their angle of attack.

In one embodiment, the arms 200,300 may be positioned at an adjustable height relative to the prize area 24B, such that the rotating arms 200,300 may be adjusted to mix prizes at different positions relative to the bottom or floor of the prize area 24B. In one embodiment, the rotating arms 200,300 may move up and down—such as by raising and lowering the drive shaft 212,312 or moving the arms upwardly and downwardly along the shaft.

It is contemplated that more than one set of arms 200,300 may be placed in a prize area 24B. For example, instead of a single set of large rotating arms, four sets of smaller rotating arms may be used.

Figure 4:
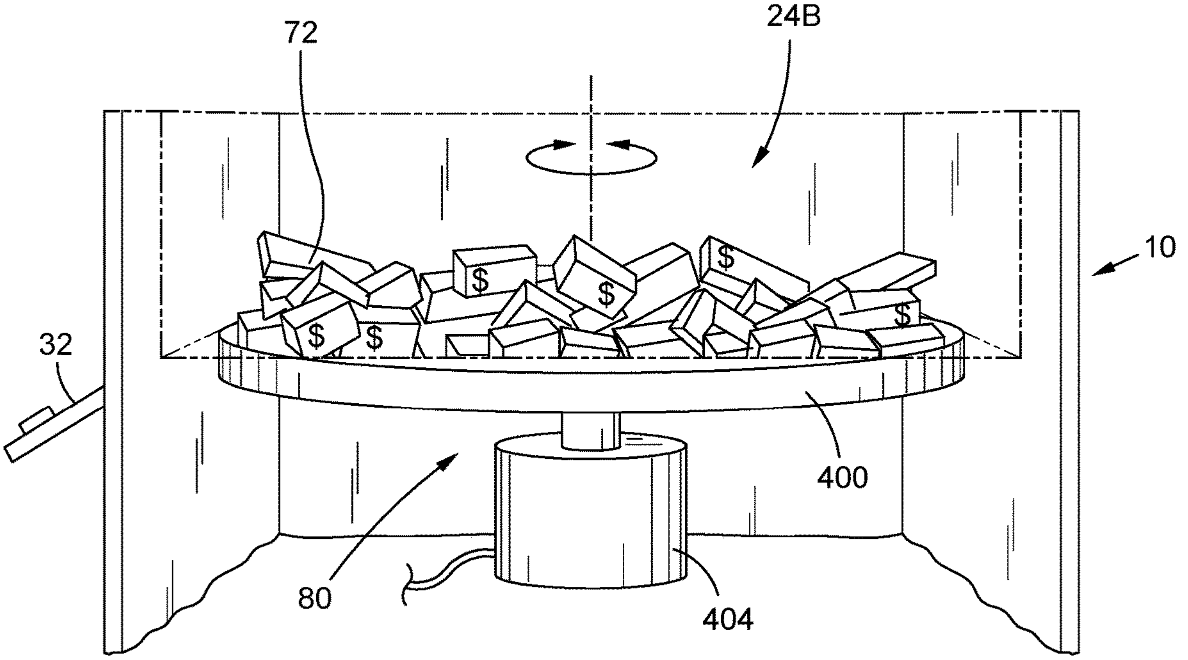
FIG. 4 illustrates yet another embodiment of a prize mixing device.
Figure 5:
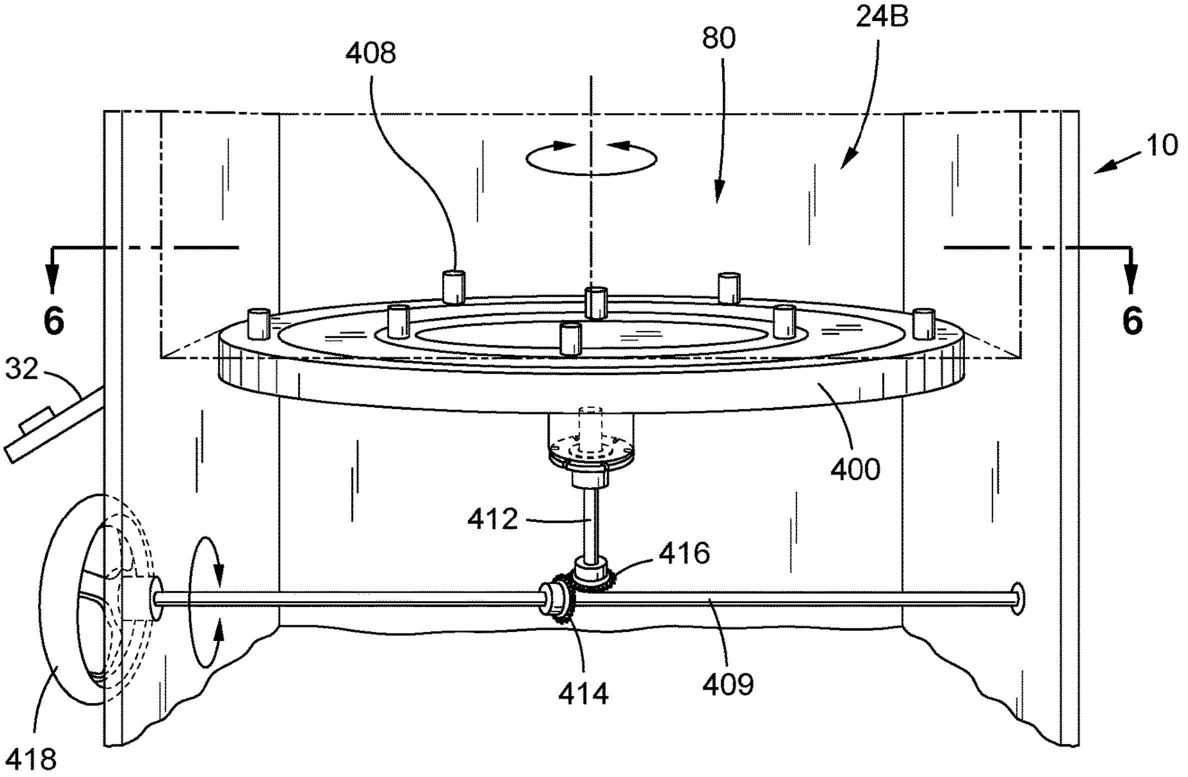
FIG. 5 further illustrates the prize mixing device of FIG. 4.
Figure 6:
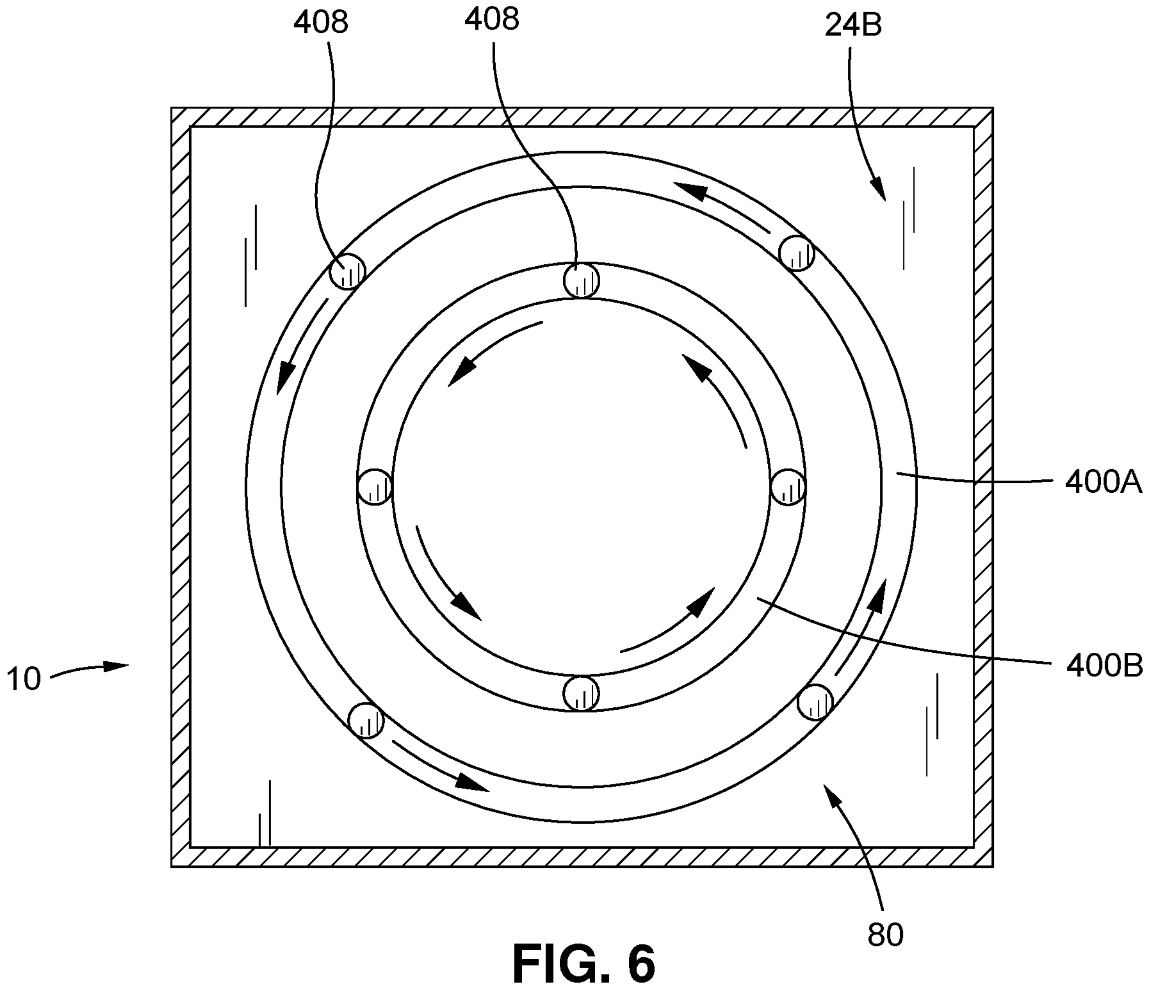
FIG. 6 illustrates additional details of the prize mixing device of FIG. 4.

FIGS. 4-6 illustrates another embodiment where the prize mixer 80 comprises protrusions or other prize-contacting elements 408, such as rods, which are movable relative to the prizes in the prize area. The protrusions 408 may be a cylinder, but might have other shapes. The height and diameter or other outside dimension may vary, as may the number of protrusions 408.

In one embodiment, the protrusions or other elements 408 may be mounted to movable supports 400 and extend upwardly therefrom into the prize area 24B. The movable supports 400 might comprise, for example, ring-shaped bodies (see FIG. 6) in or at the bottom of the prize area 24B. The protrusions or other prize-contacting elements 408 may extend upwardly from these movable supports 400.

The movable supports 400 may be driven, such as to rotate, thus causing the associated protrusions 408 to move within the prize area. The rings or other movable supports 400 may be the same or different sizes and may be arranged in various positions at or in the bottom of the prize area 24B. In the embodiment illustrated in FIG. 6, for example, multiple concentric rings 400A,400B may be provided. The rings 400A,400B or other movable supports may be driven so that they rotate in the same direction and speed, or might be driven in different directions or speeds. Depending on the size and number of protrusions 408 and the configuration of the movable supports 400 and their movement (direction and/or speed, etc.) and/or the duration of mixing, the mixing effect may be varied.

It will be appreciated that the prize mixer may have a variety of other configurations. For example, the prize mixer might comprise spokes that extend outwardly from a shaft or hub and have paddles or other elements mounted thereon (such as at an end thereof), whereby rotation of the prize mixer causes the prize mixer to contact prizes in the prize area to mix them.

In some embodiments, the prize mixer 80 may comprise elements located at different elevations relative to the prize area 24B. For example, the prize mixer 80 might comprise a shaft that extends into the prize area 24B. One or more first arms may be connected to the shaft near the bottom (and thus near the bottom of the prize area 24B), while one or more second arms might be connected to the shaft higher up or above the one or more first arms.

Further, the prize mixer 80 may be moved in manners other than by rotation. For example, the prize mixer 80 might comprise an elongate ramped body (such as having a triangular cross-section) which is configured to move back and forth (such as side to side) in the prize area. Thus, the prize mixer 80 might be configured for linear or other movement.

The prize mixer 80 might also combined with other elements or features. For example, some prizes may be located on a rotatable table or support in the prize area. Rotation of the prize table may effectuate movement of some prizes. A prize mixer 80 of the invention may be utilized in conjunction with the rotating table in order to provide mixing that is enhanced by the rotational movement of the prizes.

Prize Mixer Drive Mechanism

As indicated above, in one or more embodiment, the prize mixers 80 of the invention may comprise one or more elements which are movable in the prize area 24B. The prize mixer of the invention preferably comprises a drive mechanism. In one embodiment, the drive mechanism may comprise at least one motor 404, such as illustrated in FIG. 4. The motor 404 may be configured, for example, to drive or rotate the drive shaft 212,312 which rotates the arms 200, 300 (shown in FIGS. 2 and 3) or the movable members 400 (shown in Figure FIGS. 4-6). The motor 404 might be configured to drive such elements by one or more gears, belts, transmissions or other drive elements or connections. Further, more than one more motor might be utilized.

In one embodiment, the drive mechanism, such as the motor 404, may be controlled by the controller of the prize capture and dispensing device 10. For example, the controller of the prize capture and dispensing device 10 might automatically cause the operation of the drive mechanism, or might cause the operation of the drive mechanism upon the occurrence of certain events or in response to certain inputs, such as one or more player inputs as described herein. In one or more embodiments, the controller of the device 10 is configured, at one or more times, to generate and/or transmit one or more control instructions which cause the drive mechanism to operate. The one or more signals may, for example, be transmitted to the motor or a sub-controller for the motor (such as a signal which is transmitted to operate a power switch of the motor).

In other embodiments, the drive mechanism might comprise a hand-operated or manual drive mechanism—wherein an operator must provide manual input to effectuate movement of the prize mixer. For example, as illustrated in FIG. 5, the drive mechanism might comprise a drive rod 409 having a first gear 414 mounted thereon for driving a second gear 416 which is associated with the drive shaft 412. The drive rod 409 might be rotated, for example, by a hand crank or handle 418, such as located outside of the device. In such a configuration, a player's manual input to the hand crank 418 (such as rotation thereof), effectuates rotation of the drive shaft 409 and thus the driven shaft 412 (via gears 414,416). Of course, other configurations of manual drives for a prize mixer might be provided.

Prize Mixer Operation

The prize mixer 80 of the invention may be controlled or operated in various manners, including at different times, based upon different inputs and the like.

For example, the prize mixer 80 may be configured to be constantly active, such that prizes 72 are constantly mixed. In another embodiment, the prize mixer 80 might be configured to be active except during play of the device by a player. For example, the prize mixer 80 may be operated periodically when it is not being played in order to attract players. In particular, operation of the prize mixer 80 in an "attract" mode may draw the attention of potential players as a result of the movement of prizes in the play area (visual attraction) but also as a result of one or more prizes that may be of interest to a player being moved to a capture-available position.

In another embodiment, the prize mixer 80 might be configured to be operated in response to certain events, such as certain triggering events. For example, at the initiation of each play (such as by input of funds by a player, pushing of a start/play button, etc.), the controller of the device 10 might use an RNG to randomly determine whether the prize mixer 80 should be operated (automatically or at player election). As another example, the prize mixer 80 might be operated every 5 or 10 plays (or other number) or after certain time intervals (every 5 minutes, etc.), or in response to certain outcomes or events (such as one or more losing game outcomes, etc.).

As indicated, in some embodiments, the prize mixer 80 might be operated automatically—e.g. without player input. In other embodiments, the prize mixer 80 may be activated by a player, such as using a player input device (such as the input device 32 or the hand-crank 418). Player activation may be customized and/or controlled such that the prize mixer 80 may be incorporated into game play.

In some embodiments, a player may activate the prize mixer 80 at any time, and in other embodiments, a player may only be permitted to activate the prize mixer 80 at certain times or upon certain events. For example, certain criteria might be required in order for the player to obtain the opportunity to operate the prize mixer 80. For example, a player might be required to pay an additional amount to operate the prize mixer 80 (e.g. pay $1.00 to play the device without operation of the prize mixer; pay an extra $0.50 to operate the prize mixer), or might otherwise be required to "earn" the opportunity to operate the prize mixer 80. For example, a player might earn the opportunity to operate the prize mixer 80 based upon a number of games played, by receiving certain outcomes (such as a certain number of losing outcomes, etc.). In embodiments where the device 10 includes a wagering game portion, certain outcomes of the wagering game portion or certain events (amounts wagered or the like) might entitle the player to operate the prize mixer 80. In embodiments where the prize capture and dispensing device 10 is connected to a player tracking system, the player's play of the device may be tracked (and for example, the remote tracking server might instruct the controller of the device 10 to award the player with an operation of the prize mixer). Further, the event may be an external event such as the identification of a player account as a VIP account, such that all VIP accounts are automatically awarded one or more activations of the prize mixer. It is contemplated that the predetermined event may be any internal event occurring in the prize capture and dispensing device 10, or an external event.

Further, in addition to whether the prize mixer 80 is operated (and criteria therefor), the manner of operation of the prize mixer may be controlled. For example, a player might be required to pay an extra $0.50 to operate the prize mixer 80 for 5 seconds (or at a first speed), or pay $1.00 to operate the prize mixer for 15 seconds (or at a second, higher speed). In other words, criteria may be applied that effect mixing variables (duration, speed, direction, arm position, etc.).

As yet another example, a player might be awarded one or more opportunities to operate the prize mixer 80. The award might be promotional—such as a "free" operation of the prize mixer, or might be an award for various activities (purchases or expenditures, etc.). In some embodiments, the player might be provided with a media, such as a ticket, which the player can provide to the device 10 (such as read by a reader of the device 10) to provide the player with the opportunity to operate the prize mixer 80.

In some embodiments, if the player is entitled to operate the prize mixer 80, an indication might be provided to the player. For example, operation of the prize mixer 80 might be via a button 32. If the prize mixer 80 is available for operation, the button might be illuminated/flash, etc. In other embodiments, a display or other indicator might indicate to the player the availability of the operation of the prize mixer 80. In such a configuration, the player might elect to operate the prize mixer 80 or might not elect to operate the prize mixer 80. For example, if a desired prize is already at the top of the prize area, the player may not wish to operate the prize mixer 80 and thus cause the desired prize to move to another location.

Of course, various of the prize mixer control configuration or features might be used on combination, might be modified, etc.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A prize mixer for a prize capture and dispensing device having a prize area containing prizes, comprising:

one or more members extending upwardly from a bottom of said prize area into said prize area, said one or more members mounted to at least one movable support, said movable support movable by a drive mechanism, said at least one movable support comprising a ring-shaped support; and said drive mechanism configured to cause a position of said one or more members within said prize area to change, causing said one or more members to contact one or more of said prizes in said prize area to effectuate a mixing of said prizes in said prize area.

2. The prize mixer in accordance with claim 1, comprising first and second ring-shaped supports arranged concentrically.

3. An amusement-type game device configured to present a prize-capture game to a player and having a prize mixer, comprising:

a housing;

a user input device configured to receive an input from said player of said amusement-type game device;

a prize area associated with said housing, said prize area for containing a plurality of prizes, one or more of which may be captured as a winning prize as a result of the play of the amusement-type game device;

a prize mixer located in said prize area and configured to mix said plurality of prizes therein, said prize mixer comprising:

a rotatable shaft;

one or more radially extending members connected to said rotating shaft and at least partially located in said prize area, said one or more radially extending members having one or more contacting surfaces configured to contact one or more prizes in said prize area when rotated by said rotatable shaft; and a drive mechanism coupled to said rotatable shaft to effect rotation of said rotatable shaft;

and a controller, said controller configured to control said prize mixer in at least two operational modes, wherein in a first operational mode, said prize mixer is not activatable by user input to said user input device and in said second operational mode, said prize mixer is activated in response to user input to said user input device.

4. The amusement-type game device of claim 3, wherein in a third operational mode, said controller activates said prize mixer independent of user input to said user input device.

5. The amusement-type game device of claim 4, wherein said controller is configured to activate said prize mixer when said prize-capture game is not being played.

6. The amusement-type game device of claim 4, wherein said controller is configured to activate said prize mixer every N plays of said prize-capture game, wherein $N>1$.

7. The amusement-type game device of claim 3, wherein said controller enables said second operational mode in response to placement of a wager by said player to said amusement-type game device.

8. The amusement-type game device of claim 7, wherein said player is required to place a wager of a first amount to play said prize-capture game and is required to place a wager of a second amount which is larger than said first amount in order to cause said controller to enable said second operational mode.

9. The amusement-type game device of claim 3, wherein said controller is configured to enable said second operational mode in response to a triggering event received during play of said prize-capture game at said amusement-type game device.

10. The amusement-type game device of claim 3, wherein said controller is configured to enable second operational mode based upon information associated with a player account of said player.

11. The amusement-type game device of claim 3, wherein in at least one of said operational modes said controller is configured to vary at least one of a duration, speed and/or direction of operation of said prize mixer.

12. The amusement-type game device of claim 3, further comprising a prize capture device which is controllable by said player, wherein said second mode of operation is not activated while said prize capture device is controllable by said player.

13. The amusement-type game device of claim 3, wherein said user input device comprises a push-button.

14. The amusement-type game device of claim 13, wherein said push-button has a visual indicator which illuminates when said second mode of operation is enabled.

15. A method of mixing a plurality of prizes in a prize area of an amusement-type game device, comprising the steps of:

enabling, via a controller of said amusement-type game device, either a first prize mixer operational mode or a second prize mixer operational mode;

receiving, at said controller via a user input device, a user input;

when said first prize mixer operational mode is enabled, said controller not activating said prize mixer in response to said user input; and when said second prize mixer operational mode is enabled, said controller activating said prize mixer in response to said user input;

wherein in response to said controller activating said prize mixer, a drive mechanism of said prize mixer is activated which causes said one or more prize mixing elements located in said prize area to move one or more of said plurality of prizes by contacting said prizes to effectuate a mixing of said prizes.

16. The method of mixing of claim 15, wherein said drive mechanism comprise a motor and said step of activating said prize mixer comprises activating said motor.

17. The method of mixing of claim 15, comprising enabling, via said controller, said second mode of operation in response to receiving a wager from a player of said amusement-type game device.

18. The method of mixing of claim 15, further comprising illuminating a visual indicator associated with said user input device when said second prize mixer operational mode is enabled.

19. The method of mixing of claim 15, further comprising enabling said second prize mixer operational mode in response to information associated with a player account.

20. The method of mixing of claim 15, further comprising enabling said second prize mixer operational mode in response to a triggering event occurring during the play of a prize-capture game presented at said amusement-type game device.

* * * * *